United States Patent
Chang

(10) Patent No.: US 6,173,635 B1
(45) Date of Patent: Jan. 16, 2001

(54) BASE STRUCTURE OF A CIRCULAR SAW

(76) Inventor: Kevin C. Y. Chang, No. 6, Lane 190, San Ming Rd., Feng Yuan Taichung Hsien (TW)

(*) Notice: Under 35 U.S.C. 154(b), the term of this patent shall be extended for 0 days.

(21) Appl. No.: 09/296,389

(22) Filed: Apr. 23, 1999

(51) Int. Cl.[7] .............................. B23D 45/14; B27B 5/20
(52) U.S. Cl. ...................... 83/471.3; 83/473; 83/477.1; 83/490; 83/581
(58) Field of Search .............................. 83/471.2, 471.3, 83/473, 490, 581, 472, 477, 477.1, 477.2

(56) References Cited

U.S. PATENT DOCUMENTS

| | | | |
|---|---|---|---|
| 4,581,966 | * | 4/1986 | Kaiser et al. ................. 83/490 X |
| 4,774,866 | * | 10/1988 | Dehari et al. ................. 83/490 X |
| 5,347,902 | * | 9/1994 | Brickner et al. ............... 83/490 X |
| 5,473,821 | * | 12/1995 | DiMarco ...................... 83/471.3 X |
| 5,623,860 | * | 4/1997 | Schoene et al. ................ 83/471.3 |
| 5,651,297 | * | 7/1997 | Garuglieri ..................... 83/471.3 X |
| 5,737,986 | * | 4/1998 | Garuglieri ..................... 83/471.3 X |
| 5,896,798 | * | 4/1999 | Garuglieri ..................... 83/581 X |
| 5,988,031 | * | 11/1999 | Wixey ......................... 83/471.3 |
| B1 4,934,233 | * | 8/1994 | Brundage et al. ............... 83/471.3 X |

* cited by examiner

Primary Examiner—Clark F. Dexter
(74) Attorney, Agent, or Firm—Connolly Bove Lodge & Hutz LLP

(57) ABSTRACT

An improved base structure of a circular saw includes a base, a rotatable base plate mounted on the base, a mounting seat, and a rotary seat. The base plate has an upper face provided with a recess at a rear end. The mounting seat is screwably secured on both sides of the recess, and has a pivot portion with a screw hole at a bottom end. The pivot portion is located in the recess. The rotary seat can rotate relative to the mounting seat and is provided with a curved slide groove for receiving an adjusting screw. The rotary seat has a pivot portion at a bottom end that corresponds to the pivot portion of the mounting seat. The pivot portion of the rotary seat has a shaft hole that corresponds to the screw hole of the pivot portion of the mounting seat, whereby they are coaxially joined by a pivot that connects the pivot portions integrally to the recess of the base plate, so that the rotary seat can rotate utilizing the pivot as center of rotation and allow adjustment of inclination relative to the upper face of the base plate.

4 Claims, 4 Drawing Sheets

BASE STRUCTURE OF A CIRCULAR SAW

BACKGROUND OF THE INVENTION (a) Field of the Invention

The present invention relates to a circular saw, more particularly to an improved base structure of a circular saw which is stable during sawing operation and which allows easy adjustment of inclination angles.

(b) Description of the Prior Art

Sawing devices, such as scroll saws, circular saws, are common wood working tools. Conventional circular saws are disclosed in, for instance, U.S. Pat. No. 4,934,233 (see FIGS. 1 and 2). U.S. Pat. No. 5,623,860, and R.O.C. Utility Model Patent No. 133040 (Saw Blade Protective Cover Safety Device for Circular Saws). A conventional circular sawing device generally includes a base 1, a rotatable base plate 2 mounted on the base 1, and a rotary seat 3 provided on and extending from a rear side of the base 1. A top edge of the rotary seat 3 is fixedly connected to a pivotal end 4 of a circular saw 5. When it is necessary to adjust the left and right inclination sawing angle, the left and right inclination angles of the rotary seat 3 can be adjusted to achieve sidewise inclining sawing of workpieces. However, as the rotary seat 3 is located at and extends from the outer side of the base plate 2, the center of gravity of the entire circular saw 5 is away from the center of the base plate 2, resulting in loss of stability and shifting of the center of gravity of the circular saw 5 to the back during operation. Furthermore, when the rotary seat 3 rotates with the base plate 2 in level rotational adjustment of positions, if the level rotational angle of the base plate 2 is excessive, the rotary seat 3 will often come into contact with the base 1 on both sides and the surrounding objects, which considerably limits the rotational space and angle of the circular saw 5, as well as affects the structural strength of the base 1. Furthermore, since the rotating center shaft of the rotary seat 3 is located at the outer side of the base plate 2, and since it is farther away from the center of the base plate 2, adjustment of the left and right inclination of the circular saw 5 is relatively troublesome. Therefore, improvement on conventional circular saws is necessary.

SUMMARY OF THE INVENTION

A primary object of the present invention is to provide an improved base structure of a circular frame. A preferred embodiment of the improved base structure of a circular saw includes a base, a rotatable base plate, a mounting seat, and a rotary seat. The base plate is mounted on the base. The base plate has a recess formed at a rear end of an upper face thereof in a suitable position. Two positioning bolts are screwably and symmetrically provided on both sides of the recess. The mounting seat is screwably secured above the recess by means of two bolts disposed on both sides of the recess. The mounting seat is a generally semi-circular structure that straddles the recess in said base plate, and has having a pivot portion at a bottom end thereof in the center. The pivot portion is located in the recess of the base plate and having a screw hole with a central axis aligning with a radial line of the rotatable base plate located on the upper face of said base plate. The rotary seat is mounted to the mounting seat. The rotary seat is rotatable relative to the mounting seat to permit adjustment of inclination angle thereof. The rotary seat is provided with a curved slide groove for slidable displacement of an adjusting bolt. The rotary seat has a pivot portion at a bottom end thereof in the center that corresponds to the pivot portion at the bottom end of the mounting seat. The pivot portion of the rotary seat has a pivot hole that corresponds to the hole of the pivot portion of the mounting seat. A pivot passes through the pivot portions of the mounting seat and the rotary seat to thereby pivotally and integrally mount the pivot portions in the recess of the base plate. The pivot has a central axis that is likewise aligned with the radial line located on the upper face of the base plate, whereby the rotary seat can utilize the pivot as center of rotation to perform adjustment of inclination angles relative to the upper face of the base plate.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
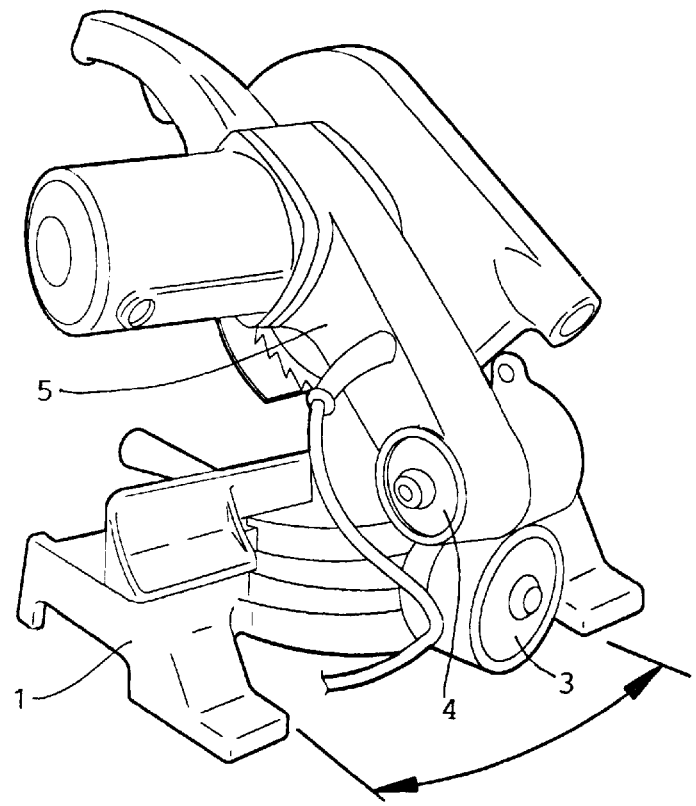
FIG. 1 is a schematic view of the structure of the conventional circular saw.
Figure 2:
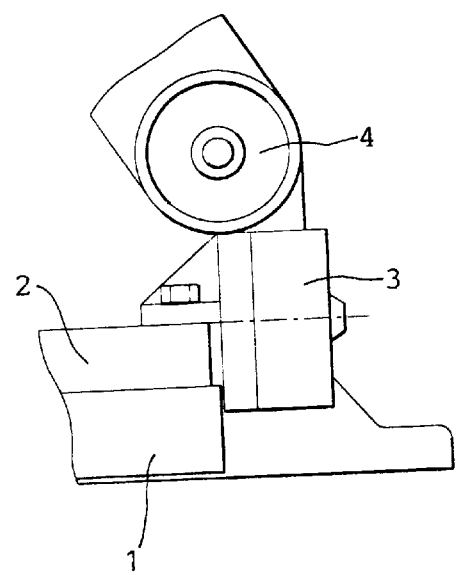
FIG. 2 is a side view of the conventional circular saw in part.
Figure 3:
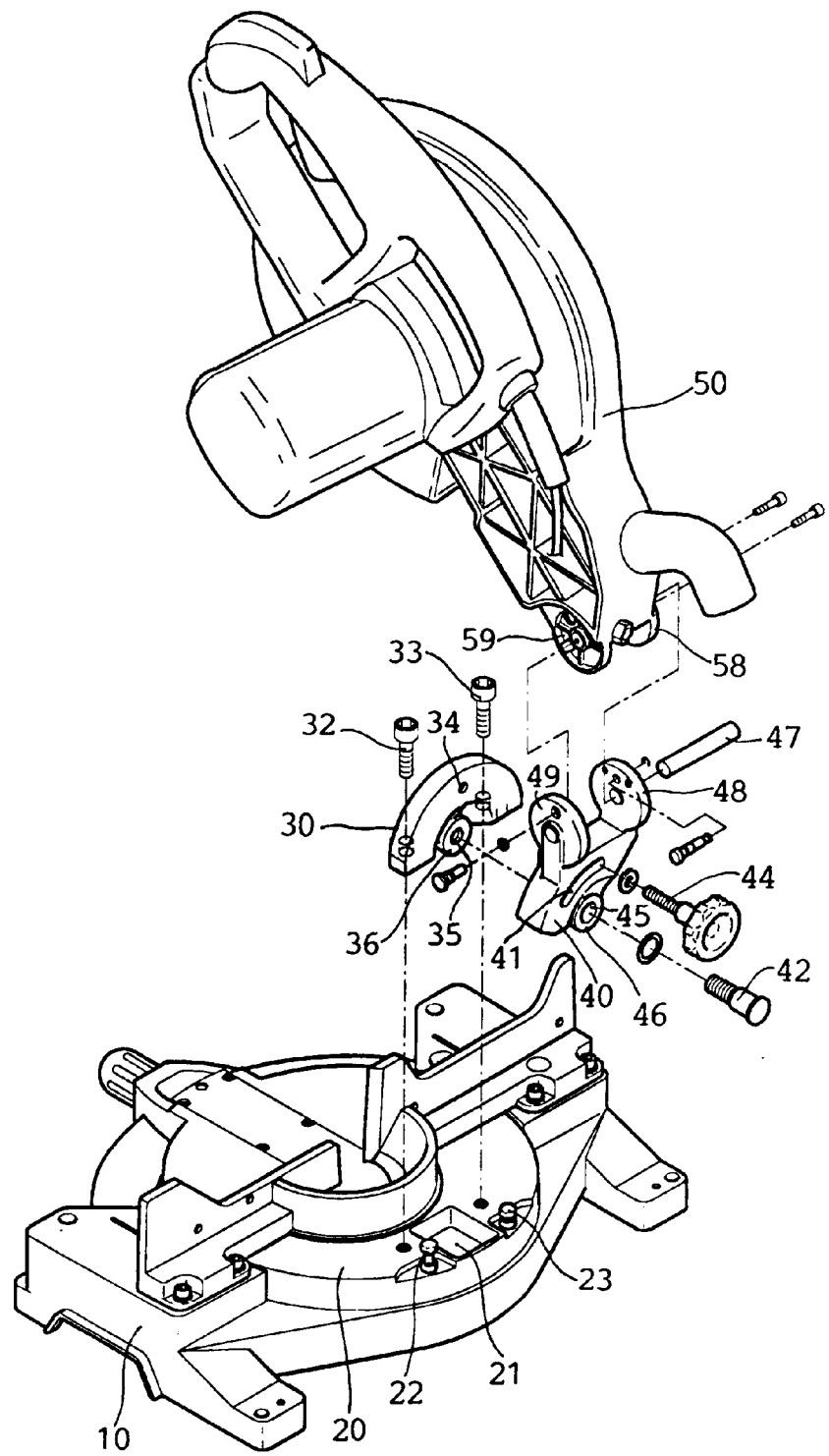
FIG. 3 is an exploded perspective view of a base structure according to the present invention.
Figure 4:
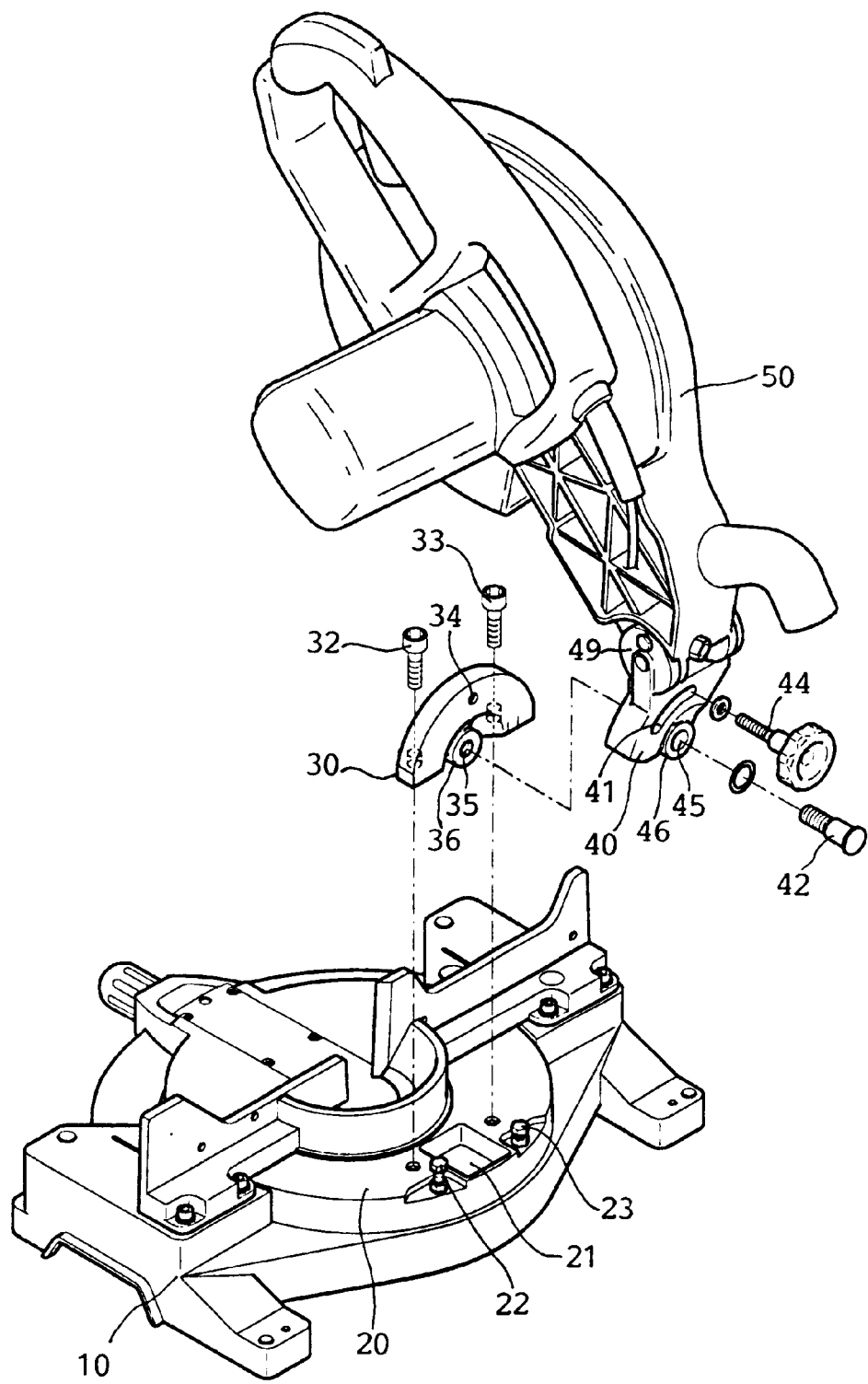
FIG. 4 is a further exploded perspective view of the base structure.
Figure 5:
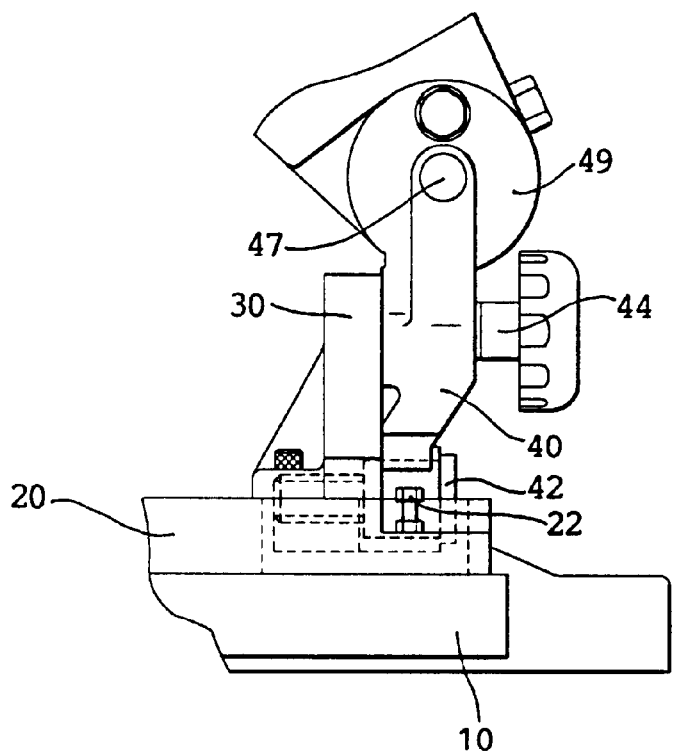
FIG. 5 is a side view of the base structure of the present invention in part.
Figure 6:
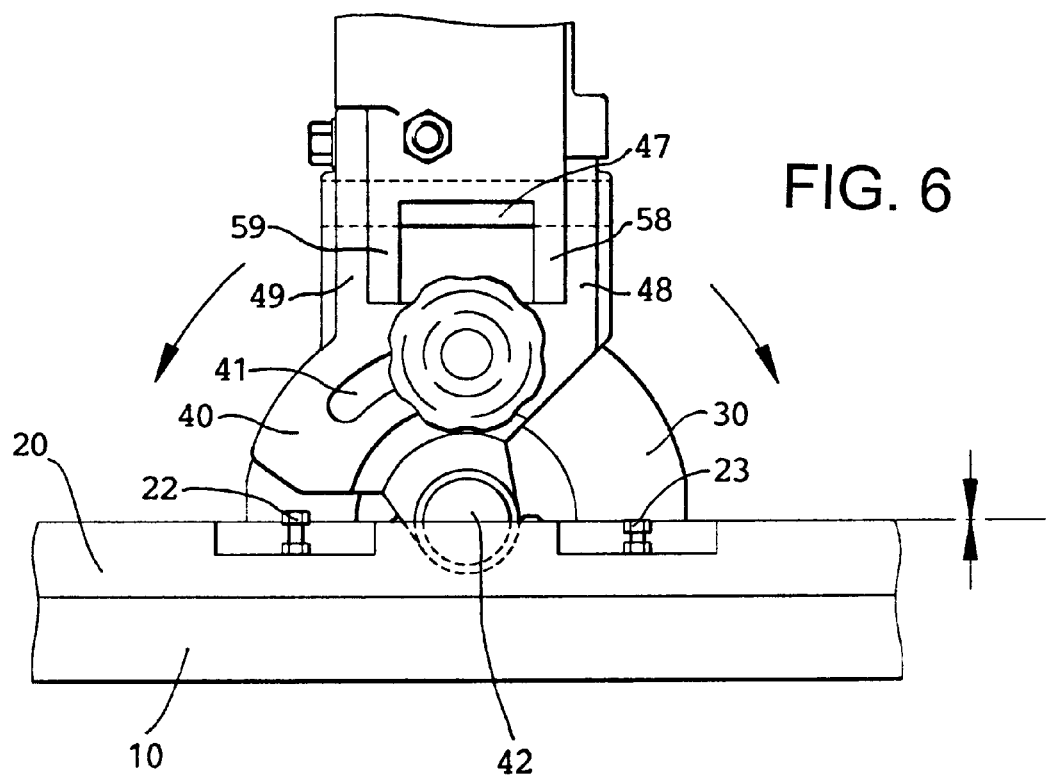
FIG. 6 is a schematic view illustrating operation of the circular saw.

With reference to FIGS. 3 to 6, a preferred embodiment of an improved base structure of a circular saw according to the present invention includes a base 10, a rotatable base plate 20 mounted on the base 10, a mounting seat 30, and a rotary seat 40. The base plate 20 has a recess 21 provided at a rear end of an upper face thereof in a suitable position. Two positioning bolts 22, 23 are respectively provided on both sides of the recess 21. The positioning bolts 22, 23 can check the rotation of the rotary seat 40 from both sides. The mounting seat 30 is screwably secured by two bolts 32, 33 disposed on both sides of the recess 21 in the base plate 20.

The mounting seat 30 is a generally semi-circular structure that straddles the recess 21 and screwably secured on both sides of the recess 21. The mounting seat 30 has a pivot portion 36 at a bottom end in the center. The pivot portion 36 is located in the recess 21 of the base plate 20. The pivot portion 36 has a screw hole 35 that has a central axis aligning with a radial line extending from the center of rotation of the base plate 20 on the face of the base plate 20. The mounting seat 30 is provided with a locking screw hole 34 for receiving an adjusting bolt 44 to screwably secure the rotary seat 40 to the mounting seat 30.

The rotary seat 40 is capable of rotation relative to the mounting seat 30 to permit its inclination angle. The rotary seat 40 is formed with a curved slide groove 41 for slidable displacement of the adjusting bolt 44. The rotary seat 40 has a pivot portion 46 at a bottom end in the center that corresponds to the pivot portion 36 of the mounting seat 30. The pivot portion 46 of the rotary seat 40 has a pivot hole 45 that corresponds to the screw hole 35 in the pivot portion 36 of the mounting seat 30 and that is coaxial therewith to permit pivotal connection with a pivot 42, whereby the pivot portions 36, 46 of the mounting seat 30 and the rotary seat 40 can be integrally and pivotally mounted in the recess 21 of the base plate 20. The central axis of the pivot 42 is aligned with the radial line on the face of the base plate 20. Therefore, the rotary seat 40 can utilize the pivot 42 as center of rotation and perform adjustment of angles of inclination relative to the level face of the base plate 20. The rotary seat 40 further has two pivot portions 48, 49 on both sides of a top edge thereof. A shaft 47 passes through the pivot portions 48, 49 and pivot portions 58, 59 at a bottom end of a circular saw 50, whereby the circular saw 50 can utilize the pivot 42 as center of rotation following the rotation of the rotary seat 40 during angle adjustment to thereby achieve rotational adjustment of the sawing angle.

The structural features and effects of the present invention as compared to the prior art are discussed hereinafter:

1. Since the center of gravity of the rotary seat 40 pivotally connected with the circular saw 50 and that of the pivot fall on the base plate 20, the circular saw 50 has a better stability during sawing operations. On the contrary, as the rotary seat of the conventional circular saw is located exterior of the base plate, the base may become unstable, or even slant rearwardly, during the sawing operation due to outward displacement of the center of gravity.
2. Since the rotary seat 40 of the present invention is situated within the base plate 20, when the base plate 20 rotates during position adjustment, the rotary seat 40 will not come into contact with the parts of the base 10 that are on the outer side of the base plate 20 or other surrounding objects during rotation thereof. It can therefore be appreciated that the present invention considerably enhances the rotational space and angle of the base plate 20. Besides, the base 10 may hence increase the structural areas of the extensions from both sides thereof to better stabilize the center of gravity of the entire circular saw. On the contrary, the rotary seat of the conventional circular saw will often contact the base on both sides or other objects when rotating with the base plate.
3. Since the rotational center shaft of the circular saw 5 of the present invention during left and right inclination thereof is the pivot 42, which is located in the recess 21 on the rear side of the face of the base plate 20 and is relatively near the center of the base plate 20, adjustment of the inclination angle of the circular saw 5 is easier. On the contrary, as the rotational center shaft of the conventional circular saw during left and right inclination is located on the outer side of the base plate, and its distance to the center of the base plate is comparatively far, adjustment of the inclination angle of the conventional circular saw is more difficult.
4. In the present invention, the pivot portions 58, 59 of the circular saw 50 are pivotally clamped to the pivot portions 48, 49 on both sides of the top edge of the rotary seat 40. Obviously, the present invention is more stable than the conventional circular saw that has the pivotal structure on a single side.
5. Since the rotational center shaft of the circular saw 5 of the present invention during downward sawing is located in the radius of the base plate 20, the circular saw 50 can accomplish the sawing operation in a more quick and precise manner when sawing workpieces of the same thickness, thus enhancing the sawing efficiency.

In view of the aforesaid, it can be seen that the present invention provides a vast improvement over the prior art.

In summary, the present invention provides an improved base structure of a circular saw, and is mainly directed to a circular saw in which the center of gravity of the rotary seat pivotally connected to circular saw and the pivot are located in the base plate, and the pivot is located in the recess on the rear side of the face of the base plate so that it is relatively near to the center of the base plate. Due to the construction of the base structure as described above, the circular saw of the present invention is more stable during sawing operation, and adjustment of its inclination angles is easier.

Although the present invention has been illustrated and described with reference to the preferred embodiment thereof, it should be understood that it is in no way limited to the details of such embodiment but is capable of numerous modifications within the scope of the appended claims.

What is claimed is:

1. A circular saw assembly comprising a base, a rotatable base plate mounted on said base, said base plate having a recess formed at a rear end of an upper face thereof, two positioning bolts being screwably and symmetrically provided on opposite sides of said recess, a mounting seat being screwably secured above said recess by two bolts disposed on opposite sides of said recess;

said mounting seat being a generally semi-circular structure that straddles said recess in said base plate, said mounting seat having a pivot portion at a bottom end thereof and in the center of said bottom end, said pivot portion being located in said recess of said base plate and having a screw hole with a central axis aligning with a radial line of said rotatable base plate located on said upper face of said base plate;

a rotary seat supporting a circular saw and being mounted to said mounting seat, said rotary seat being rotatable relative to said mounting seat to permit adjustment of an inclination angle thereof, said rotary seat being provided with a curved slide groove for slidable displacement of an adjusting bolt, said rotary seat having a pivot portion at a bottom end thereof and in the center of said bottom end that corresponds to said pivot portion at said bottom end of said mounting seat, said pivot portion of said rotary seat having a pivot hole that is aligned with said screw hole of said pivot portion of said mounting seat, a pivot passing through said pivot hole of said mounting seat and into said screw hole of said rotary seat to thereby pivotally and integrally mount said pivot portion of said mounting seat and said pivot portion of said rotary seat in said recess of said base plate, said pivot having a central axis that is likewise aligned with said radial line located on said upper face of said base plate, whereby said rotary seat utilizes said pivot as center of rotation to perform adjustment of the inclination angle relative to said upper face of said base plate.

2. The circular saw assembly as defined in claim 1, wherein said positioning bolts limit rotational angles of said rotary seat from both left and right sides.

3. The circular saw assembly as defined in claim 1, wherein said mounting seat is provided with a locking screw hole for passage of said adjusting bolt that screwably secures said rotary seat to said mounting seat.

4. The circular saw assembly as defined in claim 1, wherein said rotary seat has two pivot portions on both sides of a top edge thereof, a shaft passing through said pivot portions of said rotary seat and through pivot portions provided at a bottom end of said circular saw, whereby said circular saw can rotate with said rotary seat using said pivot as center of rotation.

* * * * *